Figure 1:
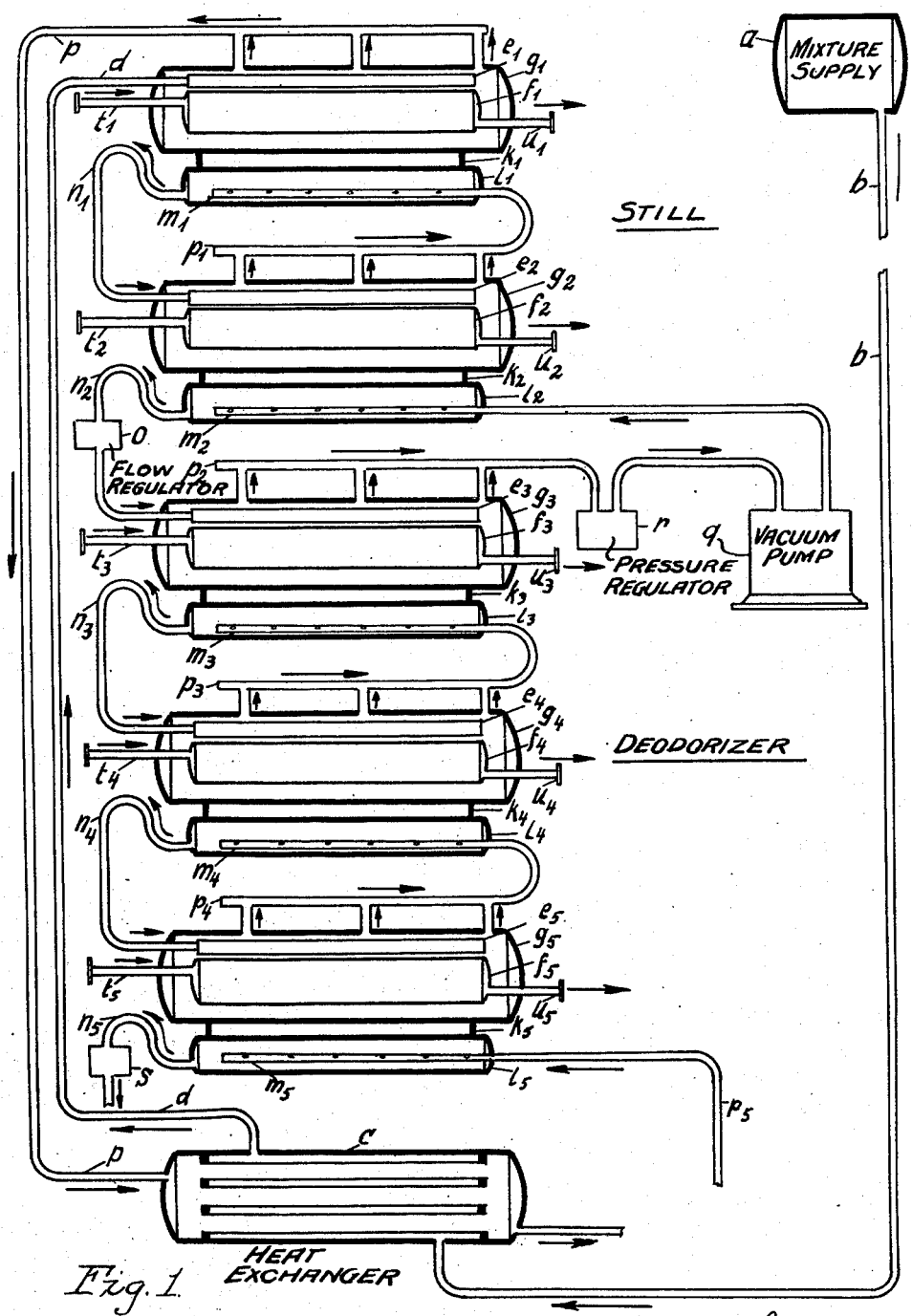

Patented Apr. 27, 1937

2,078,841

UNITED STATES PATENT OFFICE 2,078,841

APPARATUS FOR CONTINUOUS DISTILLATION AND DEODORIZATION

Philipp Lorenz Fauth, Wiesbaden-Dotzheim, Germany, assignor to Gesellschaft zur Verwertung Fauth'scher Patente m. b. H., Wiesbaden, Germany, a company of Germany Application June 14, 1933, Serial No. 675,842
In Germany June 30, 1932

2 Claims. (Cl. 202—173)

The objects of this invention are to carry out the two operations, i. e., the distillation of mixtures of solvent and oils and fats and deodorization of oils and fats, hitherto carried out separately, in one continuous operation, to overcome the faults of the known methods of operation hitherto existing and to make the working process considerably more economical.

The process of this invention comprises allowing the mixture to flow in a relatively thin layer over a considerably curved heated surface, for example the outer wall of a steam drum constructed in the form of a round container, whereby the main quantity of the solvent is evaporated from the mixture. The round container is so built into a receiving container that an annular space is formed between the two containers, through which steam flows in countercurrent to the mixture flowing down in a state of very fine distribution over the heated surface, which steam takes up the residues of solvent still contained in the oil.

The steam, employed for expelling the solvent residues, before it arrives at the part of the apparatus serving for the distillation, has, according to the invention, likewise in countercurrent, taken up the substances of undesirable taste and odour from the oil flowing out from the distillation zone of the apparatus.

The vapours sucked out of the part of the apparatus serving for the deodorization are thereby simultaneously used for the pre-deodorizing and for the following distillation, whilst the whole of the discharging vapours and gases are employed for preheating the mixture.

This preheating is known per se in the distillation of mixtures; it was, however, hitherto not possible to employ the vapours discharging during the separately carried out deodorizing process for distillation purposes and then to utilize them together with the distilled off gases entirely for preheating the mixture.

It is also of importance that by the combination of the deodorizing process with the distillation process the amount of heat which is employed in the deodorizing of the oil is saved, since the subsequent distillation with the sucked out deodorizing vapours initiates the deodorizing process and the oil reaches the deodorizing apparatus at a high temperature. This represents a considerable economy in the expenditure of heat.

The mixture and the oil according to the process of the invention are distributed over the heating surfaces with the aid of a suitable distributing channel, which is disposed centrally above the steam drum. By this arrangement, incrustation of the heating surfaces is avoided owing to the continuous inlet and discharge. The further advantage is also obtained that the mixture at the commencement of the distillation first moves in a slow stream in a state of fine distribution over the surface, so that the main quantity of the solvent is vaporized on the upper surface of the steam drum and the gases are easily drawn off.

The heating of the steam drums is with advantage effected by the hot deodorized oil discharging at about 160° C. which at the same time offers the advantage that the oil itself in this manner undergoes cooling to about 90° C. In order further to utilize this heat the oil can be passed through a mixture-preheater.

Both the distillation apparatus and the deodorizing apparatus are with advantage composed of several heating elements superimposed one above the other in order to effect as complete an action as possible.

Since the deodorizing apparatus is under vacuum a regulator known per se is built in the lead between the same and the distilling apparatus, which renders it possible for the oil to pass over without breaking the vacuum. A pump built in the lead serves to convey the vapours from the deodorizing apparatus to the distilling apparatus.

Figure 2:
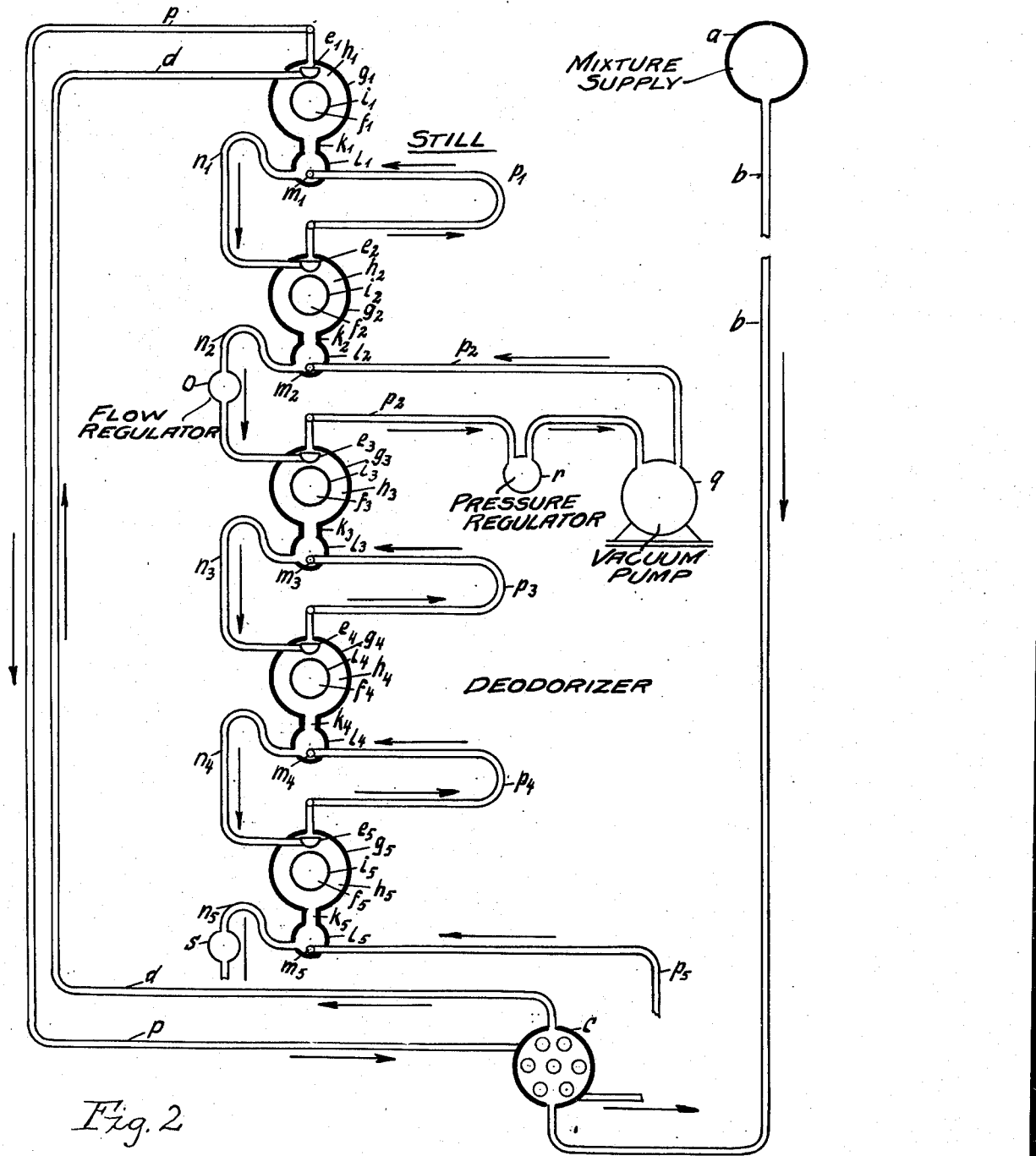

An embodiment of apparatus suitable for carrying out the process of the invention is shown diagrammatically and by way of example in the accompanying drawings in which Fig. 1 is a front elevation, partly in section, and Fig. 2 an end elevation, partly in section.

The mixture is introduced into the elevated container $a$, from which it flows through the lead $b$ into the condenser $c$ (mixture-preheater). Discharge from this preheater takes place at the top through the lead $d$, which leads to the distributing channel $e_1$ for the mixture. This distributing channel $e_1$ is disposed above the inner container $f_1$, constructed in the form of a steam drum, which is so disposed in the container $g_1$, that an annular space $h_1$ is formed between the two containers. The mixture flows from the distributing channel $e_1$ over the heated curved wall $i_1$ through the space $k_1$ into the cylindrical container $l_1$ in which the steam nozzle $m_1$ is disposed. The oil flows through the lead $n_1$ to the distributing channel $e_2$ of a second apparatus arranged in the same manner. The overflow of the oil from $l_1$ to $e_2$ is so regulated by correspondingly forming the lead $n_1$ that the container $l_1$ and the space $k_1$ always remain full of oil. In the second apparatus the oil again flows through the distributing channel $e_2$ over the heated curved wall $i_2$ and the steam drum $f_2$ through the space $k_2$, container $l_2$ and lead $n_2$ to the deodorizing apparatus disposed thereunder. Since this apparatus is to be maintained under vacuum, a regulator $o$ is constructed in the lead $n_2$, which renders the inlet of the oil possible, whilst keeping the vacuum zone closed. The above described procedure is repeated in the following apparatus. The hot steam required for the deodorizing process passes through the lead $p_5$ into the nozzle $m_5$ of the lowest apparatus flows through the oil disposed in the container $l_5$ and space $k_5$, then sweeps in the annular space $h_5$ over the oil flowing over the curved wall $i_5$ and passes through the steam connections $p_4$ and $p_3$ into the two apparatus disposed above the same and here in like manner comes into the most intimate contact in countercurrent for the purpose of effecting deodorization. The two apparatus are arranged in the same manner as that described above, so that individual explanations are not necessary.

The vapours are sucked out of the uppermost of the three lower apparatus through the lead $p_2$ by a vacuum pump $q$ and forced into the nozzle $m_2$ of the next apparatus. A regulator $r$ can be built in the lead $p_2$ in front of the vacuum pump $q$, which renders it possible to operate according to the process of German specification No. 532,428. The steam entering the nozzle $m_2$ flows through the oil in the container $l_2$ and the space $k_2$, sweeps over the outer walls $i_2$ of the steam drum $f_2$ and enters through the lead $p_1$ into the uppermost apparatus, where the path of the steam just described is repeated. The steam then passes together with the distilled gases through the discharge lead $p$ to the condenser $c$. The finished deodorized oil discharges from the lead $n_5$ of the lowest apparatus; the vacuum zone is closed by the oil discharging regulator $s$. The hot steam enters at $t_1$, $t_2$, $t_3$, $t_4$ and $t_5$ and the water of condensation discharges at $u_1$, $u_2$, $u_3$, $u_4$ and $u_5$.

It should be understood that the term "oil" as used in the appended claims includes "fat".

What I claim is:

1. Apparatus for the continuous distillation of mixtures of oils or fats and solvents and for deodorizing the resultant oil or fat in a continuous operation, comprising a series of deodorizing chambers, a series of distilling chambers, gaseous fluid conveying means connecting the deodorizing chambers in series from the top of a deodorizing chamber to the bottom of the next preceding deodorizing chamber, gaseous fluid conveying means connecting the distilling chambers in series from the top of a distilling chamber to the bottom of the next preceding distilling chamber, gaseous fluid conveying means connecting the series of deodorizing chambers with the series of distilling chambers from the top of the first of the series of deodorizing chambers to the bottom of the last of the series of distilling chambers, a pressure regulator and a vacuum pump connected in said last-mentioned gaseous fluid conveying means for maintaining the deodorizing chambers under vacuum, liquid conveying means connecting the deodorizing chambers together in series from the bottom of a deodorizing chamber to the top of the next succeeding deodorizing chamber, liquid conveying means connecting the distilling chambers together from the bottom of a distilling chamber to the top of the next succeeding distilling chamber, liquid conveying means connecting the series of deodorizing chambers with the series of distilling chambers from the bottom of the last of the series of distilling chambers to the top of the first of the series of deodorizing chambers, a liquid flow regulator connected in said last-mentioned liquid conveying means for regulating the flow therein and sealing the vacuum in said deodorizing chambers, means for supplying the mixture to the upper part of the first distilling chamber, means for removing deodorized distillate from the lower portion of the last of the deodorizing chambers, means for supplying steam to the lower portion of the last deodorizing chamber in direct contact with the liquid therein, and means for removing steam, vapors and odors from the upper portion of the first distilling chamber.

2. Apparatus according to claim 1, in which the distilling and deodorizing chambers comprise concentric arrangements of outer hollow cylinders and inner hollow cylinders, means for distributing the liquid to be distilled or deodorized over the outer surfaces of the inner cylinders, and means for supplying heating fluid to the insides of said inner cylinders.

PHILIPP LORENZ FAUTH.